United States Patent
Baxi et al.

(10) Patent No.: US 7,806,442 B2
(45) Date of Patent: Oct. 5, 2010

(54) HOSE COUPLING WITH MOLDED SEAL INSERT

(75) Inventors: Nikhil Baxi, Cordova, TN (US); Issac Shilad, Collierville, TN (US); Stefan Naab, Reiskirchen (DE)

(73) Assignee: Parker-Hannifin Corporation, Cleveland, OH (US)

( * ) Notice: Subject to any disclaimer, the term of this patent is extended or adjusted under 35 U.S.C. 154(b) by 678 days.

(21) Appl. No.: 11/682,131

(22) Filed: Mar. 5, 2007

(65) Prior Publication Data

US 2008/0036202 A1    Feb. 14, 2008

Related U.S. Application Data

(60) Provisional application No. 60/778,977, filed on Mar. 3, 2006.

(51) Int. Cl.
*F16L 33/00* (2006.01)
(52) U.S. Cl. .................. 285/242; 285/256; 285/337
(58) Field of Classification Search .............. 285/242, 285/254, 256–257, 337
See application file for complete search history.

(56) References Cited

U.S. PATENT DOCUMENTS

| | | | | |
|---|---|---|---|---|
| 601,683 A * | 4/1898 | Smith | ................ | 285/254 |
| 2,453,997 A * | 11/1948 | MacWilliam | ................ | 285/256 |
| 3,572,768 A | 3/1971 | James et al. | | |
| 3,924,883 A * | 12/1975 | Frank | ................ | 285/256 |
| 4,596,410 A * | 6/1986 | Hughes et al. | ................ | 285/39 |
| 4,705,304 A * | 11/1987 | Matsuda et al. | ................ | 285/243 |
| 5,297,822 A * | 3/1994 | Sanders et al. | ................ | 285/258 |
| 5,486,023 A | 1/1996 | Sanders et al. | | |
| 5,524,939 A * | 6/1996 | Bartholomew | ................ | 285/242 |
| 5,582,437 A * | 12/1996 | Bartholomew | ................ | 285/272 |
| 5,853,202 A * | 12/1998 | Li et al. | ................ | 285/256 |
| 5,868,435 A * | 2/1999 | Bartholomew | ................ | 285/23 |
| 6,059,338 A | 5/2000 | Diederichs | | |
| 2005/0099005 A1* | 5/2005 | Fullbeck et al. | ................ | 285/256 |

FOREIGN PATENT DOCUMENTS

GB    2264338    8/1993
JP    405126286    5/1993

* cited by examiner

*Primary Examiner*—Aaron Dunwoody
*Assistant Examiner*—Fannie Kee
(74) *Attorney, Agent, or Firm*—Renner, Otto, Boisselle & Sklar, LLP

(57) ABSTRACT

A hose coupling for use in vehicle air conditioning ("A/C") systems comprises a nipple at the end of a metal tube, a tubular seal insert, and a crimp collar. The seal insert includes a tubular retainer and at least one annular sealing element made of elastomeric material integrally joined to the retainer. The sealing element protrudes radially inwardly from an inner diameter surface of the retainer such that when the sealing element is telescoped over the nipple, the sealing element will effect a seal with an outer diameter surface of the nipple. The sealing element also protrudes radially outwardly from an outer diameter surface of the retainer such that when an end portion of a hose is telescoped thereover, the sealing element will effect a seal with an inner diameter surface of the hose end portion.

14 Claims, 2 Drawing Sheets

HOSE COUPLING WITH MOLDED SEAL INSERT

RELATED APPLICATIONS

This application claims the benefit of U.S. Provisional Application No. 60/778,977 filed Mar. 3, 2006, which is hereby incorporated herein by reference.

FIELD OF THE INVENTION

The present invention relates generally to hose couplings for connecting a flexible hose to a metal tube or tube fitting. More particularly, the invention relates to hose couplings and seal inserts for use with refrigerant lines in air conditioning systems, particularly vehicle air conditioning systems.

BACKGROUND OF THE INVENTION

One method for connecting a flexible polymeric hose to a metal tube or tube fitting is to provide one or more grooves on a nipple formed by the end of the tube or as part of the tube fitting. The nipple is inserted into an open end of the flexible hose and, in some applications, one or more O-rings may be installed in respective grooves in the nipple to provide a high pressure seal against the escape of fluid, such as refrigerant, through the connection. A tubular shell surrounding the hose end and nipple is then crimped to secure the hose to the nipple.

While such design provides a leak free coupling, some drawbacks are associated therewith. One problem is making sure the O-ring or O-rings are not dislodged from the grooves while the nipple is being inserted into the hose, so that the seals will be in the proper place prior to crimping of the shell. Another disadvantage is the need to form the groove or grooves in the nipple. If done by machining, the nipple will require proper cleaning to remove any metal debris. If not removed, the debris may create a leak path.

SUMMARY OF THE INVENTION

The present invention provides a hose coupling and seal insert for connecting a flexible hose to a metal tube or tube fitting. The hose coupling and seal insert have particular application with refrigerant lines in air conditioning systems, particularly vehicle air conditioning systems.

The hose coupling comprises a nipple that may be formed by an end portion of a tube or as part of a fitting body, a tubular seal insert, and a crimp collar that may be assembled to or formed integrally with the nipple, or provided separate from the nipple such as in the form of a crimp band. The seal insert includes a tubular retainer and at least one annular sealing element made of elastomeric material integrally joined to the retainer. The sealing element protrudes radially inwardly from an inner diameter surface of the retainer such that when the sealing element is telescoped over the nipple, the sealing element will effect a seal with an outer diameter surface of the nipple. The sealing element also protrudes radially outwardly from an outer diameter surface of the retainer such that when an end portion of a hose is telescoped thereover, the sealing element will effect a seal with an inner diameter surface of the hose end portion.

The retainer ensures that the sealing element or elements will be properly positioned prior to crimping of the shell around the end portion of the hose. In addition, the retainer eliminates the need to form a groove or grooves in the nipple, and thus the drawbacks associated therewith.

The retainer may be made of any suitable material, such as metal or a composite material.

An axial outer end portion of the nipple may be deformed radially outwardly to form an axial stop preventing axial removal of the retainer from the nipple. In a preferred embodiment, the retainer is axially trapped between the axial stop and a radially outwardly extending shoulder radially inwardly spaced from the stop by a distance equal or at least equal the axial length of the retainer.

The retainer may have one or more through holes in the wall thereof, through which portions of the sealing element extend, thereby mechanically locking the sealing element to the retainer. In a preferred embodiment, the sealing element is molded to the retainer with the elastomeric material thereof flowing through the holes in the retainer wall, thereby to provide a mechanical axial and radial interlock between the sealing element and the retainer.

The sealing element may have the shape of an O-ring. The shape of the crown of the sealing element, however, may be varied as desired, or determined by the hose coupling application. The number of sealing elements on insert typically will be from one to three, but more are conceivable.

According to another aspect of the invention, the sealing elements and retainer may be formed as a unitary structure from an elastomeric material, whereby the retainer further provides a sealing function in addition to a locating function.

The crimp collar may have a shell portion that is crimped by radially inwardly deforming annular portions thereof to form radially inwardly protruding beads that engage the end portion of the hose that is surrounded by the shell portion. The preferably annular beads may be positioned such that they engage the hose at locations axially outwardly offset from respective annular sealing elements.

Further features of the invention will become apparent from the following detailed description when considered in conjunction with the drawings.

DETAILED DESCRIPTION

Figure 1:
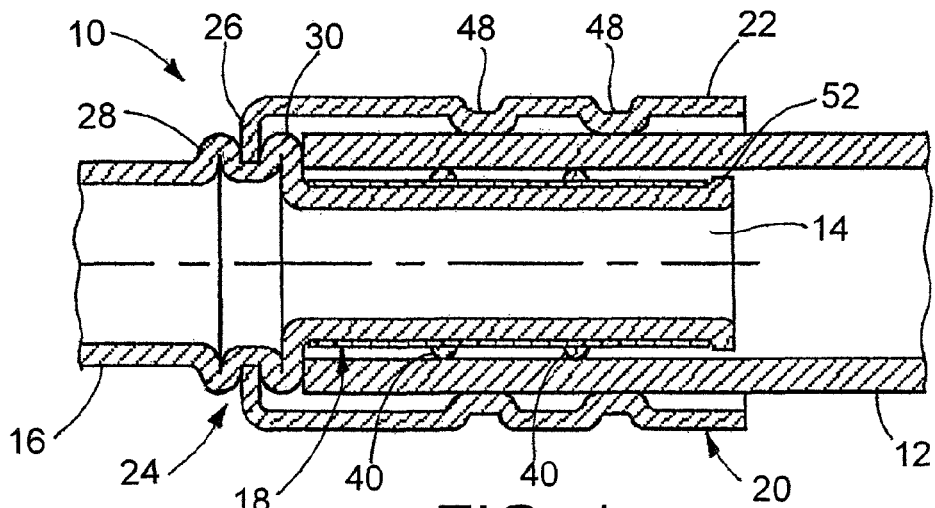
FIG. 1 is a diametral cross-sectional view of an exemplary hose coupling according to the invention, with a hose end inserted into and secured to the coupling.
Figure 2:
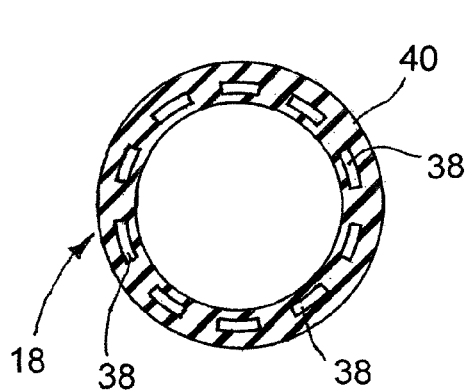
FIG. 2 is a cross-sectional view of a seal insert used in the hose coupling of FIG. 1, taken along the line B-B of FIG. 8.
Figure 3:
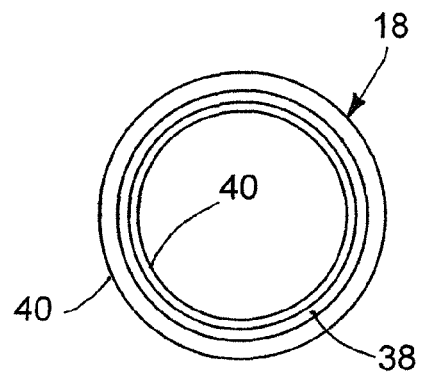
FIG. 3 is an end elevational view of the seal insert.

Referring now to the drawings in detail and initially to FIG. 1, an exemplary hose coupling according to the invention is designated generally by reference numeral 10. The hose coupling has particular application in air conditioning systems and more particularly in vehicle (automotive, truck, agricultural, off-highway, etc.) air conditioning systems, where refrigerants are used under high pressure conditions. Accordingly, the present invention will be chiefly described in this context, it being understood, however, that the principles of the invention may be more generally applicable to fluid couplings and seals.

The hose coupling 10 provides for connection of a flexible polymeric hose 12 to a nipple 14 that may be formed by an end portion of a metal tube 16 as shown or as part of a tube fitting. The coupling, in addition to the nipple, comprises a tubular seal insert 18 telescoped over the nipple, and a crimp collar 20.

The crimp collar 20 has a tubular shell portion 22 surrounding and spaced radially outwardly from the seal insert 18 to form an annular space for receiving an open end portion of the hose 12. The crimp collar may be formed integrally with a tube fitting, or the crimp collar can be a separate member such as a crimp band. In the illustrated embodiment, the crimp collar is assembled to the nipple so that it will not become separated therefrom during handling. As shown, the nipple has at it axially inner end a radially outwardly opening recess 24, and the crimp collar has an inturned flange portion 26 extending radially inwardly from an end of the shell portion 22 with the radially inner end of the flange portion 26 captured in the recess 24. The recess may be provided in any suitable manner, although in the illustrated embodiment the recess is formed by radially outwardly protruding external beads 28 and 30 on the tube. The wall of the tube 16 may be folded outwardly as by bumping to form the beads, which may extend annularly around the tube. If desired, the end of the tube, beyond the outermost bead 30, may be swaged radially inwardly to form the nipple 14 that then will have a diameter less than the balance of the tube 16 from which it is formed.

With reference to FIGS. 1-5 and 8, the tubular seal insert 18 includes a retainer 38 and at least one annular sealing element 40 made of an elastomeric material integrally joined to the retainer. In the illustrated insert, there are two sealing elements 40 maintained axially spaced apart by the retainer 38.

Figure 4:
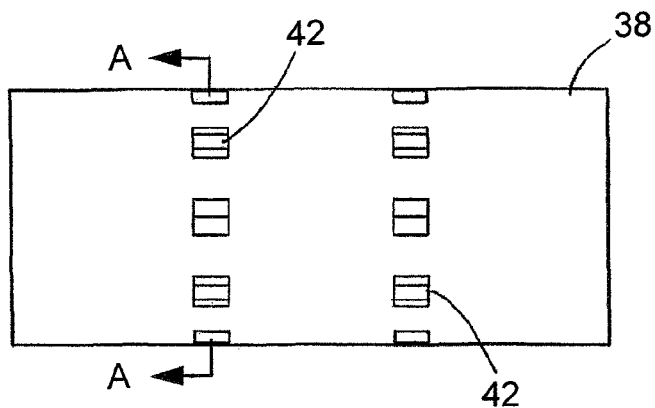
FIG. 4 is a perspective view of a retainer used in the seal insert of FIG. 2, prior to molding of sealing elements thereto.
Figure 5:
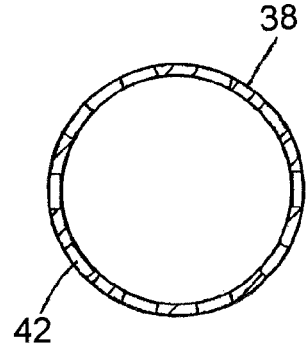
FIG. 5 is an end elevational view of the retainer of FIG. 4.
Figure 6:
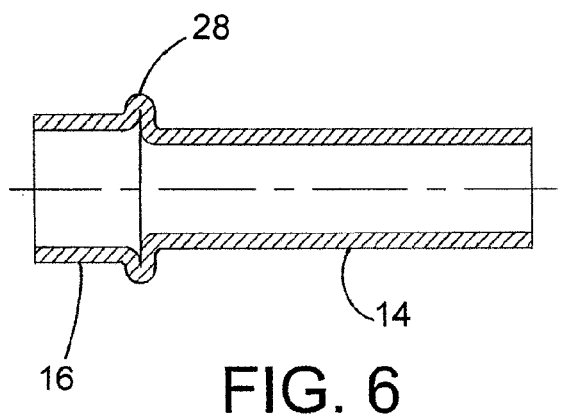
FIGS. 6-9 are sequential views showing the assembly of the hose coupling.

Each annular sealing element 40 protrudes radially inwardly and outwardly from inner and outer diameter surfaces of the retainer, respectively. The retainer may be made of metal such as steel, a composite material, or any other suitable material. The retainer has at least one through hole 42 in a wall thereof, through which a portion of the sealing element extends, thereby mechanically locking the sealing element to the retainer. As best shown in FIGS. 4 and 5, a plurality of equally circumferentially spaced apart holes 42 may be provided for each sealing element. Preferably, the sealing elements are molded to the retainer with the elastomeric material thereof extending through the holes in the retainer wall, thereby to provide a mechanical axial and radial interlock between the sealing element and the retainer.

Each sealing element 38 may have the shape of an O-ring. The shape of the crown of the sealing element, however, may be varied as desired, or determined by the hose coupling application. The number of sealing elements on insert typically will be from one to three, but more are conceivable. The sealing elements may made of any elastomeric material suitable for the intended application, such as hydrogenated nitrile butadiene rubber (HNBR) or ethylene propylene (EP) rubber.

According to another aspect of the invention, the sealing elements 40 and retainer 38 may be formed as a unitary structure from an elastomeric material, whereby the retainer further provides a sealing function.

Reverting to FIG. 1, the end portion of a flexible hose 12 is closely telescoped between the tubular shell portion 22 and the tubular insert 18 on the nipple 14, and the shell portion is crimped around the end portion of the tube. When thusly assembled, each annular sealing element 40 effects a seal to the nipple and to the inner diameter surface of the hose. The seals effected by the sealing elements will be axially spaced apart, and the shell portion may be crimped to form radially inwardly protruding beads 48 that engage the end portion of the hose at locations respectively axially outwardly offset from the annular sealing elements 40. It can also be seen in FIG. 1 that an axial outer end portion of the nipple is deformed radially outwardly to form an axial stop 52 preventing axial removal of the retainer from the nipple. More particularly, the retainer is axially trapped between the axial stop 52 and the radially outwardly extending shoulder formed by the bead 30 at the end of the nipple axially opposite the axial stop.

Referring now to FIGS. 6-9, an exemplary method of forming the coupling 10 is illustrated. First, the inner external bead 28 is formed on the tube at a location axially spaced inwardly from an end of the tube. At the same time or in a separate operation, the nipple 14 may be swaged to a reduced diameter.

Figure 7:
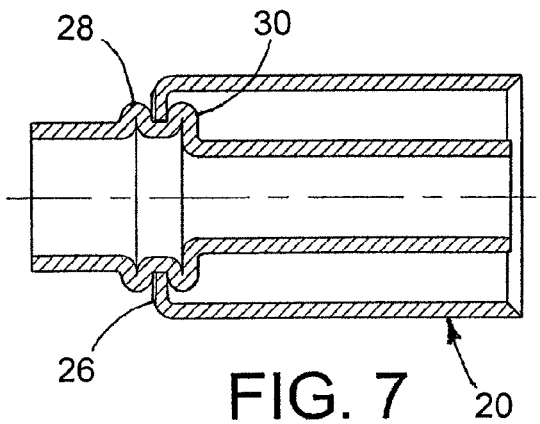

Next in FIG. 7, the crimp collar 20 is slipped over the nipple 14 until the inturned portion 26 thereof abuts the inner external bead 28. Then the outer external bead 30 is formed on the tube thereby axially trapping the inturned portion of the crimp collar between the first and second beads to retain the crimp collar on the tube with a tubular shell portion 20 of the crimp collar surrounding and radially outwardly spaced from an end portion of the tube that forms a nipple 14.

Figure 8:
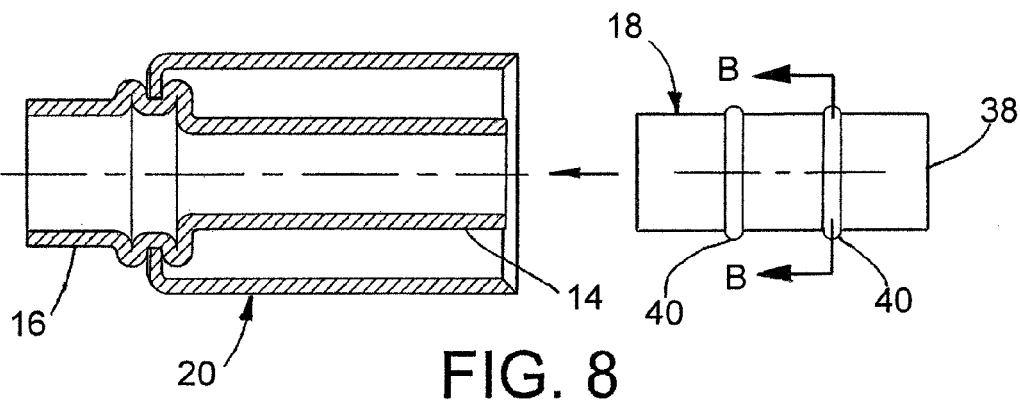

Now the seal insert 18 is slid over the nipple 14 as illustrated in FIG. 8, with the sealing elements 40 on the seal insert sealingly engaging the outer diameter surface of the nipple. A lubricant can be used if desired to make it easier to slip the seal insert over the nipple.

Figure 9:
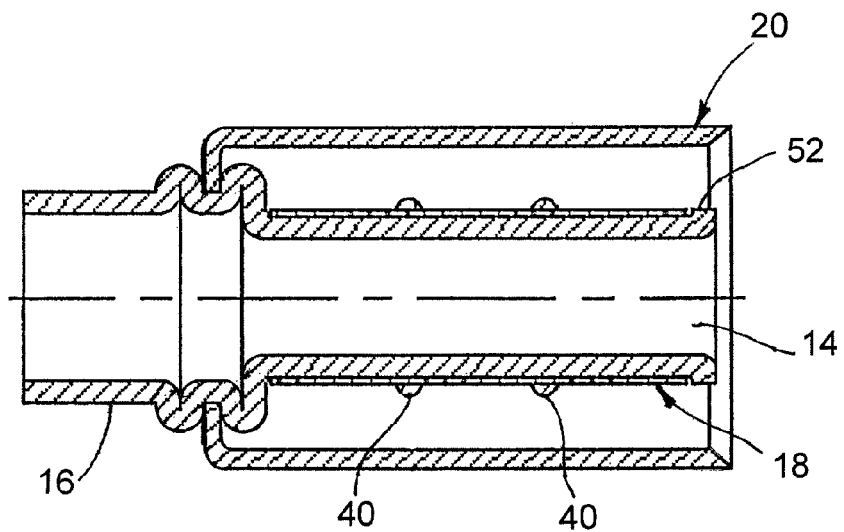

Next, the axial outer end portion of the nipple 14 is deformed radially outwardly as illustrated in FIG. 9, as by bumping or flaring, thereby to form the axial stop preventing axial removal of the retainer from the nipple.

At this point the coupling 10 is now ready to receive the hose. The end of the hose 12 is axially inserted between the shell portion 22 of the crimp collar 20 and the seal insert 18 on the nipple 14. Then the shell portion is crimped around the hose to secure the hose to the tube as illustrated in FIG. 1.

Although the sealing elements 40 have been described as being molded to the retainer, other means may be employed, such as adhesive bonding.

As can now be appreciated, no longer is it necessary to form a groove in the nipple. The groove and annular seal previously used are replaced by an easy-to-install seal insert that can be locked to the nipple by a simple locking process. The seal insert ensures that the sealing element or elements will be properly positioned, even though the sealing elements can't be seen once the hose is inserted into the coupling. The seal will also be retained against dislodgement by high pressure fluid being conveyed through the coupling.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hose coupling assembly for connecting to a metal tube or tube fitting, comprising:
    a flexible hose,
    a nipple,
    a tubular seal insert telescoped over the nipple, and
    a crimp collar having a tubular shell portion surrounding and spaced radially outwardly from the seal insert to form an annular space for receiving an end portion of the hose to be connected to the nipple,
    wherein the tubular seal insert includes
        a retainer, the retainer being made of one of a metal or a composite material, and
        at least one annular sealing element made of an elastomeric material integrally joined to the retainer, and the annular sealing element protrudes radially inwardly and outwardly respectively from inner and outer diameter surfaces of the retainer, whereby the end portion of the flexible hose can be closely telescopically positioned between the tubular shell portion and the tubular insert on the nipple, and then the shell portion crimped around the end portion of the tube and the hose with the annular sealing element effecting a seal to the nipple and to an inner diameter surface of the hose.

2. The hose coupling assembly as set forth in claim 1, wherein the nipple is formed by an end portion of a tube.

3. The hose coupling assembly as set forth in claim 1, wherein the nipple has a cylindrical outer diameter surface.

4. The hose coupling assembly as set forth in claim 1, wherein the crimp collar is assembled to the nipple.

5. The hose coupling assembly as set forth in claim 4, wherein the nipple has at an inner end thereof a radially outwardly opening recess, and the crimp collar has a flange portion extending radially inwardly from an end of the shell portion with the radially inner end of the flange portion captured in the recess.

6. The hose coupling assembly as set forth in claim 5, wherein the nipple is formed by an end portion of a tube, and the recess is formed by radially outwardly protruding beads formed by the tube.

7. The hose coupling assembly as set forth in claim 1, wherein an axial outer end portion of the nipple is bumped radially outwardly to form an axial stop preventing axial removal of the retainer from the nipple.

8. The hose coupling assembly as set forth in claim 7, wherein the retainer is axially trapped between the axial stop and a radially outwardly extending shoulder at the end of the nipple axially opposite the axial stop.

9. The hose coupling assembly as set forth in claim 1, wherein the shell portion has been crimped to form a radially inwardly protruding bead that engages the end portion of the hose at a location axially outwardly offset from the at least one annular sealing element.

10. The hose coupling assembly as set forth in claim 1, wherein the seal insert has two axially spaced apart sealing elements, and the shell portion has been crimped to form radially inwardly protruding beads that engage the end portion of the hose at locations respectively axially outwardly offset from the at least one annular sealing elements.

11. The hose coupling assembly as set forth in claim 1, wherein the retainer has at least one through hole in a wall thereof, through which a portion of the at least one annular sealing element extends, thereby mechanically locking the at least one annular sealing element to the retainer.

12. The hose coupling assembly as set forth in claim 11, wherein the at least one annular sealing element is molded to the retainer with the elastomeric material thereof extending through the hole in the retainer wall, thereby to provide a mechanical axial and radial interlock between the at least one annular sealing element and the retainer.

13. The hose coupling assembly as set forth in claim 12, wherein the at least one annular sealing element has the shape of an O-ring.

14. The hose coupling assembly as set forth in claim 1, including a second annular sealing element, wherein the annular sealing elements are axially spaced apart from one another.

* * * * *